A. L. JOHNSTON, Jr.
ANTISKID TIRE CHAIN.
APPLICATION FILED APR. 28, 1920.
1,378,821. Patented May 17, 1921.
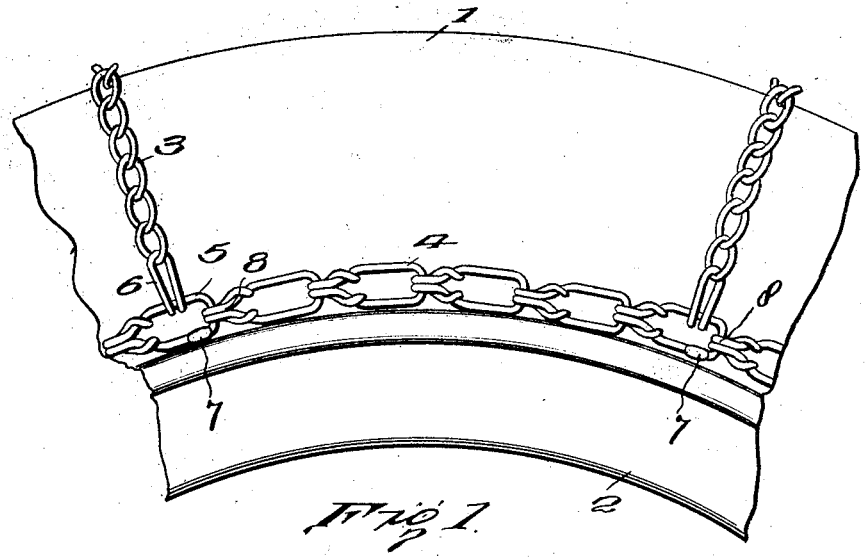
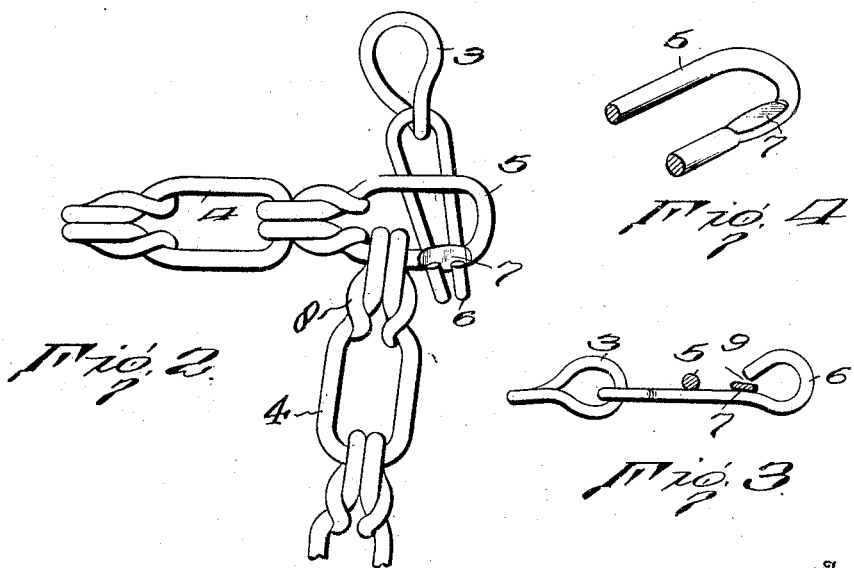
A. Langstaff Johnston, Jr., Inventor
By Wilkinson & Giusta, Attorneys

UNITED STATES PATENT OFFICE.

ANDREW LANGSTAFF JOHNSTON, JR., OF RICHMOND, VIRGINIA, ASSIGNOR TO PERCIVAL R. MOSES, OF NEW YORK, N. Y.

ANTISKID TIRE-CHAIN.

1,378,821.     Specification of Letters Patent.     Patented May 17, 1921.

Application filed April 28, 1920. Serial No. 377,192.

*To all whom it may concern:*

Be it known that I, ANDREW LANGSTAFF JOHNSTON, Jr., a citizen of the United States, residing at Richmond, in the county of Henrico and State of Virginia, have invented certain new and useful Improvements in Antiskid Tire-Chains; and I do hereby declare the following to be a full, clear, and exact description of the invention, such as will enable others skilled in the art to which it appertains to make and use the same.

The present invention relates to improvements in anti-skid tire chains, and has for an object to provide a chain of this character in which the cross chains may be readily removed from the side chains.

Another object of the invention resides in providing an improved detachable device for the cross chains which will admit of their quick release from the side chains but at the same time will prevent the accidental release during the period of usage when the chains are in place on an automobile tire.

In the accompanying drawings forming a part of this application, and in which similar reference symbols indicate corresponding parts in the several views:

Figure 1 is a fragmentary side view of an automobile tire with a quick detachable chain, such for instance as that shown applied thereto, and showing the present invention embodied therein.

Fig. 2 is an enlarged view showing the chain links in a position of release.

Fig. 3 is an edge view of one of the cross chains with a link of the said chain shown in section, illustrating the method of release; and Fig. 4 is a fragmentary perspective view of one link of the said chain with the flattened portion thereof.

Referring more particularly to the drawings, 1 designates a pneumatic and other tire and 2 the felly or rim carrying the same. A suitable non-skid chain is shown as applied on the tire 1 and consists of a number of cross chains 3 connected to a pair of annular side chains 4. These parts are of the usual construction, and form no part of the present invention.

The side chains 4 embody links 5 to which the cross chains 3 are connected, such cross chains having hooks 6 which engage with the links 5.

In accordance with the present invention the link 5 is flattened for a portion of its length, as indicated at 7, and on the inner side thereof. No metal is removed during this process but pressure is simply placed upon the sides of the link so as to compress the same. This process produces the necessary flattened portion 7 without weakening the link 5. The flattened portion 7 is, as above stated, provided on the opposite side of the link 5 from the hook when in its working position.

The links 4 and 5 are provided with eyes 8 which readily slip about on the adjacent links, as, for instance, from the position shown in Fig. 1, which it normally occupies to the position shown in Fig. 2, where the eye 8 engages upon the inner rounded portion of the link 5 after being moved across the flattened portion 7. The flattened portion 7 is therefore exposed to the hook 6 which may be swung to engage the flattened portion 7. The hook 6, as indicated in Fig. 3, is provided with a gap 9 of a dimension suitable for freely passing over the flattened portion 7, whereby the hook and the cross chain carried thereby may be readily released and connected to the side chain 4. However, the gap 9 is too small to be passed over the rounded portion of the link 5 so that to be separated the hook must first be brought to the position shown in Figs. 2 and 3.

Obviously the hook 6 should be made of substantially non-deformable metal so that these hooks may retain their shape when in use.

This is not possible when the chain is upon the wheel or tire 1, as the eye 8 is under tension and cannot be moved to the position shown in Fig. 2. The eye 8 therefore guards the cross chain 3 against accidental release and prevents the hook 6 accidentally slipping about to the inner portion of the link 5 where it might escape off the flattened portion 7.

From the foregoing it will therefore be appreciated that I have provided a simple and inexpensive construction of tire chain for permitting the separation of the links. This is particularly valuable inasmuch as the present type of tire chain requires that the hooks be opened to remove broken sections and to replace the same by new cross chains. The opening of such hooks requires also a special pair of pliers, and is attended with difficulty in operation and loss of time. A chain made according to the above invention permits the cross chains 3 to be readily and quickly removed without loss of time or the necessity for special implements.

It is obvious that those skilled in the art may vary the details of construction and arrangement of parts without departing from the spirit of my invention, and therefore I do not wish to be limited to such features except as may be required by the claims.

I claim:

1. A non-skid tire chain of the character described, including a pair of side chains composed of links connected together in annular series, and a plurality of cross chains connecting said side chains and embodying hooks engaging with certain spaced links of said side chains, said hooks being provided with gaps therein of lesser width than the normal diameter of the links of the side chains with which they engage, said last mentioned links being provided with flattened portions on their inner sides adapted to permit the passage of the gaps in said hooks, the reduced portion of each of said reduced links being locked against registry with the gap in the corresponding hook by the adjacent link of the side chain, substantially as described.

2. In an anti-skid device for automobile tires, in combination, a pair of side chains comprising loosely connected links to lie along the tire sides, and a series of cross chains to overlie the tire tread at circumferential intervals, the end elements of said cross chains and certain of said links of said side chains having complementary portions capable of registry when the device is off a tire to permit free hooking engagement or separation of the cross chains with respect to the side chains, said complementary portions being relatively located so that a link of each side chain adjacent each link thereof having one of said portions is positioned and held when the device is mounted on the tire to prevent registry of said portions for separation of the cross from the side chains.

ANDREW LANGSTAFF JOHNSTON, Jr.